(12) United States Patent
Ito et al.

(10) Patent No.: US 8,406,536 B2
(45) Date of Patent: Mar. 26, 2013

(54) INFORMATION PROCESSING APPARATUS, INFORMATION PROCESSING METHOD, AND COMPUTER PRODUCT

(75) Inventors: Hideo Ito, Tokyo (JP); Yoshihisa Ohguro, Kanagawa (JP); Yinghui Xu, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 1080 days.

(21) Appl. No.: 12/010,351

(22) Filed: Jan. 24, 2008

(65) Prior Publication Data
US 2008/0181500 A1 Jul. 31, 2008

(30) Foreign Application Priority Data

Jan. 31, 2007 (JP) ................. 2007-022108

(51) Int. Cl.
*G06K 9/36* (2006.01)
(52) U.S. Cl. ...................................... 382/232
(58) Field of Classification Search .................. 382/181, 382/232
See application file for complete search history.

(56) References Cited

U.S. PATENT DOCUMENTS

| | | | |
|---|---|---|---|
| 5,926,564 A | 7/1999 | Kimura | |
| 6,128,102 A | 10/2000 | Ota | |
| 2008/0107349 A1* | 5/2008 | Sung et al. | 382/245 |

FOREIGN PATENT DOCUMENTS

| | | |
|---|---|---|
| CN | 1129331 | 8/1996 |
| CN | 1278089 | 12/2000 |
| JP | 03-043881 | 2/1991 |
| JP | 08-305795 | 11/1996 |
| JP | 09-270902 | 10/1997 |
| JP | 11-282959 | 10/1999 |
| JP | 2005-134968 | 5/2005 |
| JP | 2005-208981 | 8/2005 |
| JP | 2005-242579 | 9/2005 |

OTHER PUBLICATIONS

Japanese Office Action dated Sep. 18, 2009 issued in corresponding Application No. JP 2008-10009211.6 and English translation thereof.
Chinese Office Action dated Feb. 25, 2010 issued in corresponding Chinese Application No. 2008100092116 and English translation thereof.

* cited by examiner

*Primary Examiner* — John Strege
(74) *Attorney, Agent, or Firm* — Harness, Dickey & Pierce

(57) ABSTRACT

When encoding each element in numeral string data, a code-string data creating unit creates code string data by assigning a code to a focused element to be encoded based on a magnitude relation between the focused element and an element adjacent to the focused element. An control unit stores primary data and the code string data as registration information in an associated manner into a storage unit. When searching for the primary data, a data extracting unit and the code-string data creating unit create code string data from image data, and a searching unit searches data stored in the storage unit based on the created code string data as search information for data having registration information that matches the search information.

18 Claims, 20 Drawing Sheets

FIG. 11

| READING ORDER | TYPE |
|---|---|
| 1 | HORIZONTAL SEPARATOR |
| 2 | TEXT |
| 3 | HORIZONTAL SEPARATOR |
| 4 | TEXT |
| 5 | GRAPH |
| 6 | HORIZONTAL SEPARATOR |
| 7 | TEXT |
| 8 | TABLE |
| 19 | TABLE |

FIG. 12

(a) 平成七年六月五日付けの PC Weekly News によると、(米) Cil社の Williams Eilrich 氏は、PowerPC と Pentium (b) [garbled/boxed characters representing same text]

(c) [empty boxes representing same text structure]

FIG. 16

| MAGNITUDE COMPARISON WITH FIRST ELEMENT ON RIGHT | MAGNITUDE COMPARISON WITH SECOND ELEMENT ON RIGHT | CODE TO BE ASSIGNED TO FOCUSED ELEMENT |
|---|---|---|
| EQUAL TO OR LARGER | EQUAL TO OR LARGER | A |
| SMALLER | EQUAL TO OR LARGER | B |
| EQUAL TO OR LARGER | SMALLER | C |
| SMALLER | SMALLER | D |

INFORMATION PROCESSING APPARATUS, INFORMATION PROCESSING METHOD, AND COMPUTER PRODUCT

CROSS-REFERENCE TO RELATED APPLICATIONS

The present application claims priority to and incorporates by reference the entire contents of Japanese priority document, 2007-022108 filed in Japan on Jan. 31, 2007.

BACKGROUND OF THE INVENTION

1. Field of the Invention

The present invention relates to a technology for encoding input data, and searching for data based on encoded data.

2. Description of the Related Art

Upon receipt of data such as an image file, a data searching device encodes the input data, stores therein the input data and the encoded data in an associated manner. When retrieving stored data, the data searching device encodes either or both title and keyword specified for desired data and, based on them, retrieves and outputs the desired data.

For example, Japanese Patent Application Laid-open No. H9-270902 discloses a conventional technology to store image data read from a material document as an image file into a storage, and to search for a desired image file from stored image files. Specifically, a ratio of the width to the height of a character rectangle in a text area is extracted from the image data as a material document attribute. The ratio is encoded based on a threshold, and the obtained code is written to each rectangle. The code is managed as registration key information in a manner associated with the image file to be used for searching for the image file.

Another conventional technology has been proposed, in which a projection histogram is created as an attribute of a text area included in image data. The projection histogram is normalized, and then encoded based on the number of black pixels at each position in the normalized projection histogram, and the encoded projection histogram is managed in a manner associated with the image data to be used for searching for the image data.

However, according to the former conventional technology, the ratio of the width to the height of a character rectangle is individually calculated on each extracted rectangle, and a code is assigned on each rectangle based on the calculated ratio. Consequently, if rectangles are extracted from pieces of text of the same contents that are enlarged or reduced with different aspect ratios, different codes are assigned to characters in the pieces. Consequently, if subject image data has a different aspect ratio (see FIG. 27), it cannot be retrieved based on codes assigned thereto.

According to the latter conventional technology, the projection histogram is encoded based on the number of black pixels corresponding to each position in the projection histogram. If the image data is enlarged only horizontally, the number of black pixels changes. As a result, different codes are assigned to the image data having the same contents.

SUMMARY OF THE INVENTION

It is an object of the present invention to at least partially solve the problems in the conventional technology.

According to an aspect of the present invention, an information processing apparatus includes: an acquiring unit that acquires numeral string data; and a creating unit that encodes the numeral string data to create code string data by assigning a code to a focused element of the numeral string data based on a magnitude relation between the focused element and an element adjacent to the focused element.

According to another aspect of the present invention, an information processing method includes: acquiring numeral string data; and encoding the numeral string data to create code string data by assigning a code to a focused element of the numeral string data based on a magnitude relation between the focused element and an element adjacent to the focused element.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is an example of area determination results on respective areas divided in order of reading according to the first embodiment;

FIG. 12 is a schematic diagram for explaining the image-conversion process shown in FIG. 5;

FIG. 16 is a conversion table for assigning a code to a focused element in the encoding process shown in FIG. 14;

DETAILED DESCRIPTION OF THE PREFERRED EMBODIMENTS

Exemplary embodiments of the present invention will be explained below in detail with reference to the accompanying drawings.

Figure 1:
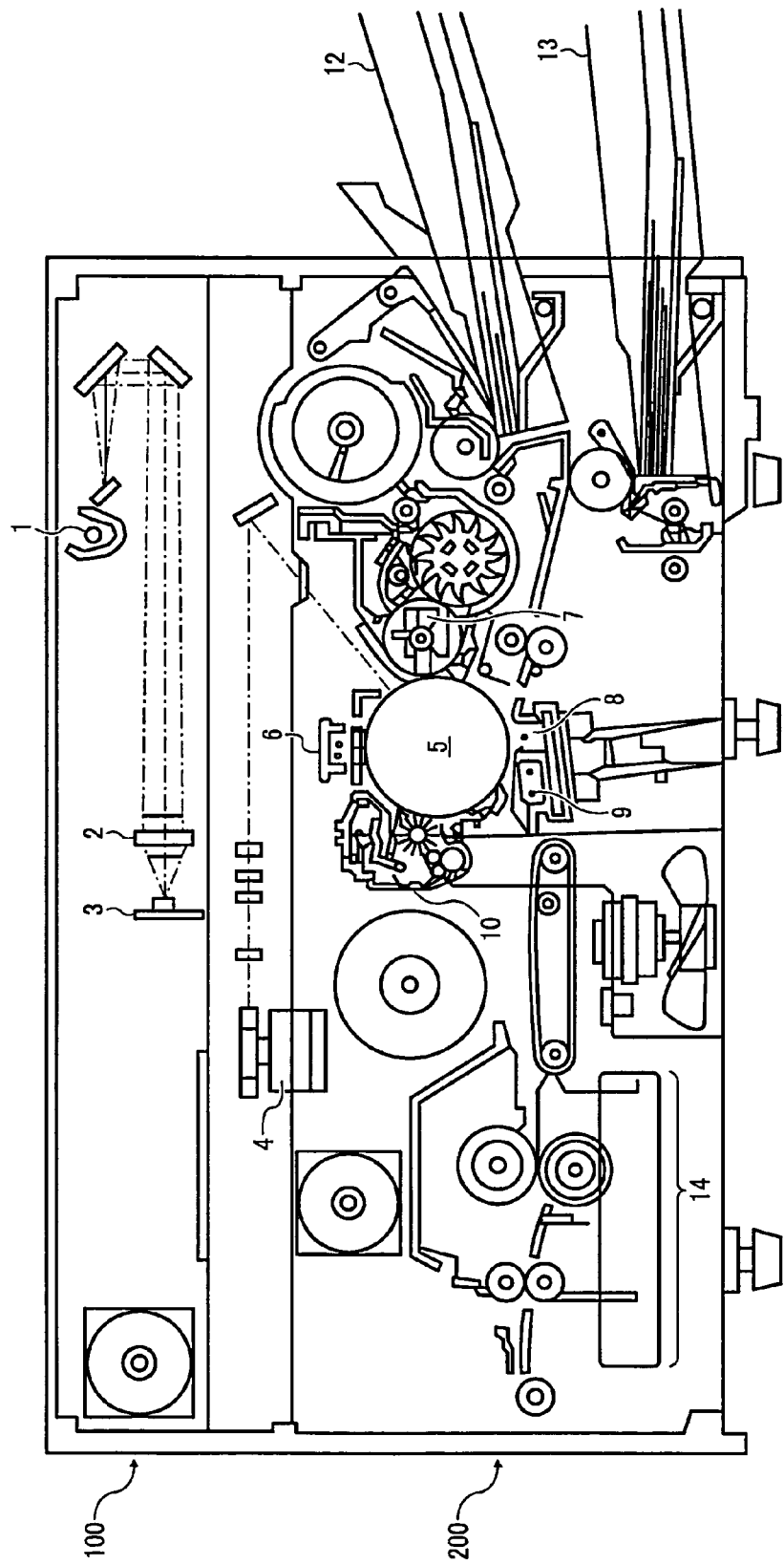
FIG. 1 is a schematic diagram of an information processing apparatus according to a first embodiment of the present invention.

FIG. 1 is a schematic diagram of a digital photocopier as an example of an information processing apparatus according to a first embodiment of the present invention. The digital photocopier includes an image reading unit 100 and an image forming unit 200.

The image reading unit 100, for example, a scanner, includes exposure glass (not shown) arranged on the top, and optical scanning system provided under the exposure glass, on which material document is to be placed. The material document placed on the exposure glass is exposed to light with an exposure lamp 1 in the optical scanning system, and reflected light when being exposed, i.e., image light, forms an image on a photoreceptor 3 through various mirrors and a lens 2 included in the optical scanning system. The photoreceptor 3 is equipped with a color charge-coupled device (CCD) image-sensor.

The optical scanning system is driven in the left-and-right direction in FIG. 1 with a mechanical drive system (not shown), so that the image light is read as image data sequentially line by line in the scanning direction by the color CCD image-sensor.

The read image data is converted into an output image by processing described later, and modulates laser light output from a writing device 4 included in the image forming unit 200. The modulated laser light forms an image on the surface of a photoconductive drum 5 through an optical system for writing. The entire surface of the photoconductive drum 5 is uniformly charged to a predetermined high potential by a main charger 6 in advance. Upon irradiation of the image light, i.e., laser light, the potential is changed depending on the intensity of the received light, and a potential distribution corresponding to the image, i.e., an electrostatic latent image is formed.

The electrostatic latent image formed on the photoconductive drum 5 is visualized by absorbing toner when passing through a development unit 7, and a toner image is created.

On the other hand, a recording sheet (not shown) is fed from a sheet cassette selected from sheet cassettes 12 and 13, and the recording sheet is sent onto the photoconductive drum 5 in synchronism with timing of forming the toner image on the photoconductive drum 5. Subsequently, the toner image on the photoconductive drum 5 is transferred onto the recording sheet by energization of a transferring charger 8. The recording sheet on which the toner image is transferred is separated from the photoconductive drum 5 by energization of a separating charger 9, a fixing unit 14 fixes the transferred toner image on the recording sheet, and then the recording sheet is discharged to the outside of the photocopier.

After the transfer of the image and the separation of the recording sheet are finished, the surface of the photoconductive drum 5 is cleaned by a cleaning unit 10 and turns to standby for next image creation.

Figure 2:
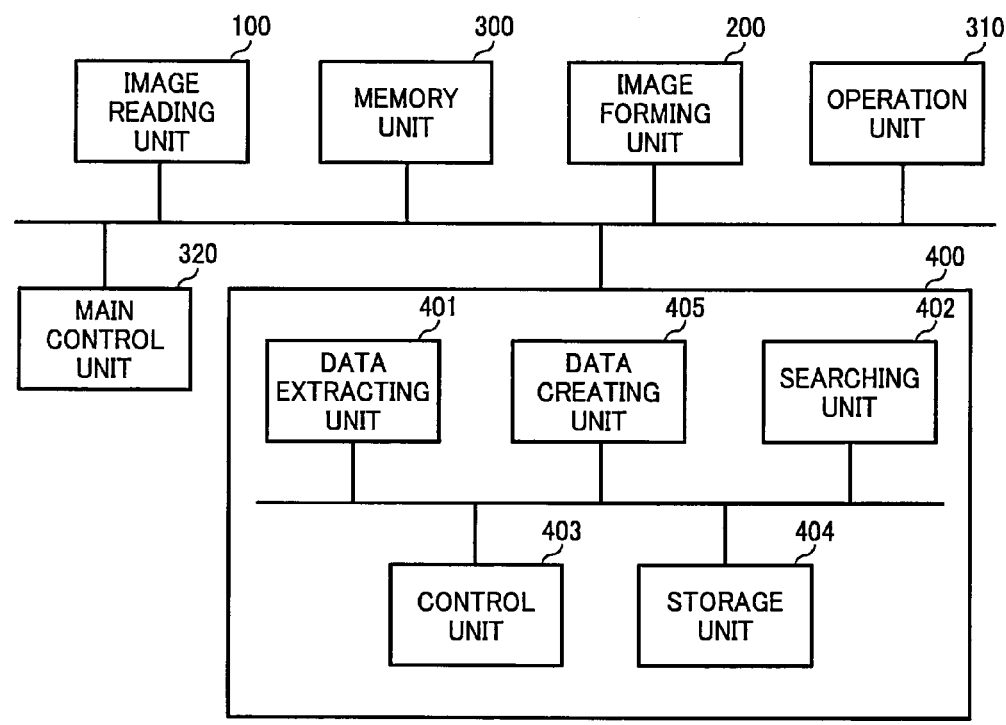
FIG. 2 is a functional block diagram of the digital photocopier shown in FIG. 1.

A hardware configuration of the digital photocopier is explained below with reference to FIG. 2. The digital photocopier further includes a memory unit 300, an operation unit 310, a main control unit 320, and an image processing device 400. In the image reading unit 100, an analog signal of an image, i.e., image data, in a bitmap format is read by the color CCD image-sensor. The analog signal is converted into a digital signal by an analog-to-digital converter (not shown). The digital signal is subjected to correction by a shading correcting unit (not shown) with respect to irregularities in photographic density. Thus, the memory unit 300 stores therein the image.

The image processing device 400 includes a data extracting unit 401, a data creating unit 405, a storage unit 404, a searching unit 402, and an control unit 403. The data extracting unit 401 extracts a string of data elements such as integer elements or floating point elements (hereinafter, "numeral string data") from image data received through the image reading unit 100. The data creating unit 405 assigns each of the data elements codes (encodes each of the data elements) based on a correlation (e.g., magnitude relation) with surrounding elements, and creates a string of code elements of a limited number of types (hereinafter, "code string data"). The storage unit 404 stores therein code string data as registration key information in a manner associated with image data. The searching unit 402 searches the storage unit 404 for image data registered in a manner associated with code string data by using the code string data as search key information. The control unit 403 controls the image processing device 400.

Each of pixels of an output image created on the memory unit 300 is applied on the image forming unit 200 in a form of binary information corresponding to black and white.

The operation unit 310 is arranged on the top surface of the digital photocopier, and receives input such as an instruction from a user. The main control unit 320 controls various displays on the operation unit 310, and performs copying operation and processing, such as registration of and searching for an image file.

The digital photocopier has a function of filing an image and registering it as an image file. Specifically, the digital photocopier extracts and stores therein ratios of the width and the height of character rectangles in a text area from read image data as a material document attribute, and to extract and to use a material document attribute of read image data as search information at search for an image file, and to search prestored image files for an image file having a material document attribute that matches the search information.

Based on the above configuration, processes of registration of an image file, searching for an image file, and image conversion are explained below in this order.

Figure 3:
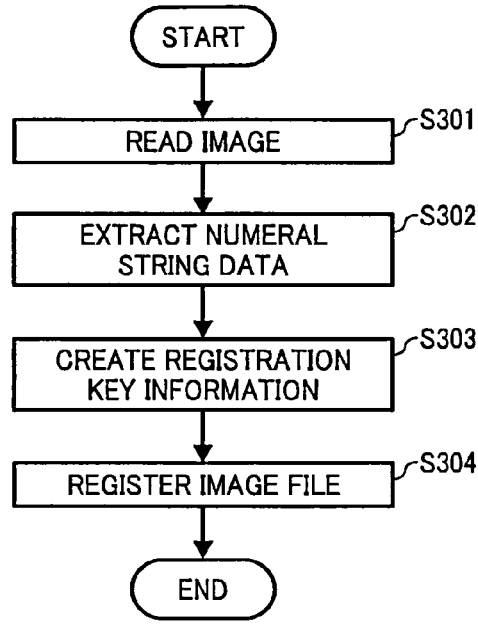
FIG. 3 is a flowchart of an image-file registration process according to the first embodiment.

The image-file registration process is explained below with reference to FIG. 3. When an image registration mode for reading a material document and registering it as an image file is selected via the operation unit 310, the main control unit 320 controls such that the image reading unit 100 reads an image of a material document, i.e., image data, and the memory unit 300 stores therein the image data as input data (step S301). The control unit 403 receives a notice of the image registration mode from the main control unit 320, and the data extracting unit 401 extracts numeral string data from the input data, i.e., the image data, in the memory unit 300 (step S302). Subsequently, the data creating unit 405 creates registration key information from the extracted numeral string data (step S303), and then an image file is created by associating the created registration key information with the input data in the memory unit 300. The image file is registered in the storage unit 404 (step S304), and the process ends.

The image-file search process is explained with reference to FIG. 4. When an image searching mode for searching for a registered image file is selected via the operation unit 310, the image reading unit 100 reads an image of a material document, and the memory unit 300 stores therein the read image as input data (step S411). The control unit 403 then receives a notice of the image searching mode from the main control unit 320, and the data extracting unit 401 extracts numeral string data from the input data, i.e., image data, in the memory unit (step S412). Subsequently, the data creating unit 405 creates search key information from the extracted numeral string data (step S413). The searching unit 402 retrieves from the storage unit 404 an image file having registration key information that matches the created search key information (step S414). The control unit 403 outputs a corresponding image file as an image to the memory unit 300. The image file is then sent to the image forming unit 200 via the memory unit 300, and is output on a recording sheet (step S415).

Figure 4:
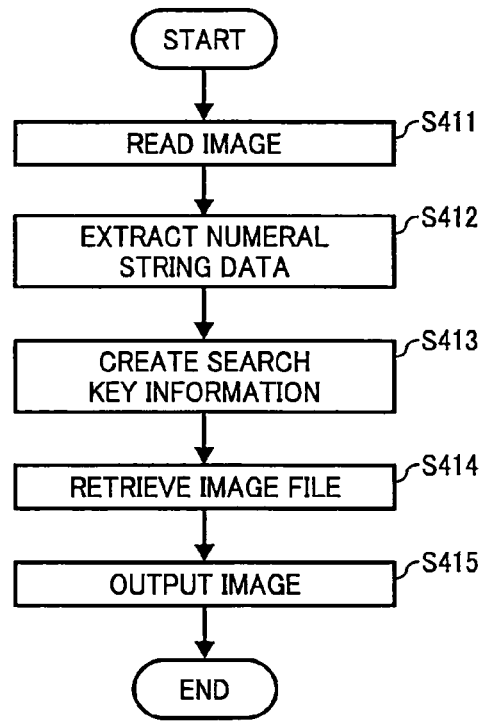
FIG. 4 is a flowchart of an image-file search process according to the first embodiment.

The process performed at step S414 shown in FIG. 4 is explained in detail below. In the following explanation, similarity between two character strings is determined by using, as an example, N-gram analysis.

For example, at step S413 shown in FIG. 4, suppose DCAABC is created as search key information, then elements are extracted two each sequentially from the left end, so that five search keys, namely, DC, CA, AA, AB, and BC, are created. Registration key information stored with the image file in the storage unit 404 is called, and the frequency of appearance of the five search keys is counted. Because it is considered that the higher the count is, the more similarity the search key information and the registration key information have, so that an image file stored in a manner associated with registration key information with a large value of the count is output as a search result.

According to the above description, it is configured to extract registration key information stored in the storage unit 404 piece by piece sequentially, and to count the frequency of appearance of the created search key. However, it is possible to reduce a processing time for data search by counting and storing in advance a frequency of each of permutations of symbols appearing in each piece of registration key information into the storage unit 404, the permutations being creatable from symbols to be used for encoding numeral string data.

The image-conversion process is explained with reference to FIG. 5. To begin with, the data extracting unit 401 receives the input image from the memory unit 300, and performs an area-extraction process to extract an area, such as a text area, a photograph area, a table area, in the input data, i.e., the image data (step S501). The data extracting unit 401 then performs an attribute-extraction process to extracts an attribute, such as a position, a size, and a type, of the extracted area (step S502).

An area and an attributes extracted in this way can be used as registration key information and search key information.

Figure 5:
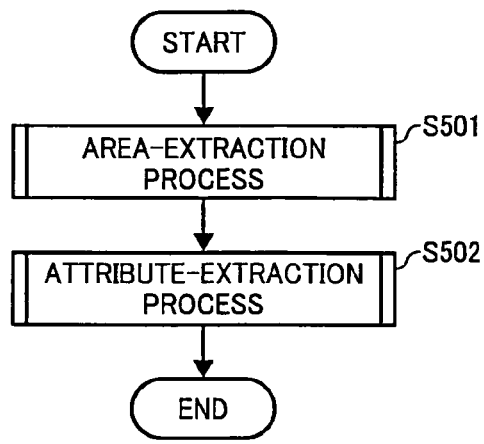
FIG. 5 is a flowchart of an image-conversion process according to the first embodiment.
Figure 6:
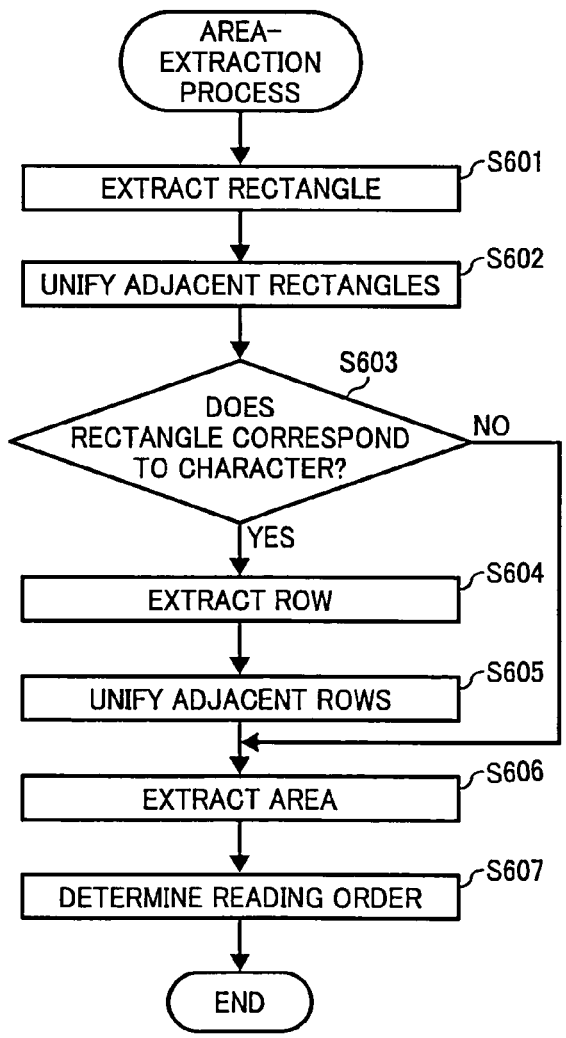
FIG. 6 is a detailed flowchart of an area-extraction process shown in FIG. 5.
Figure 7A:
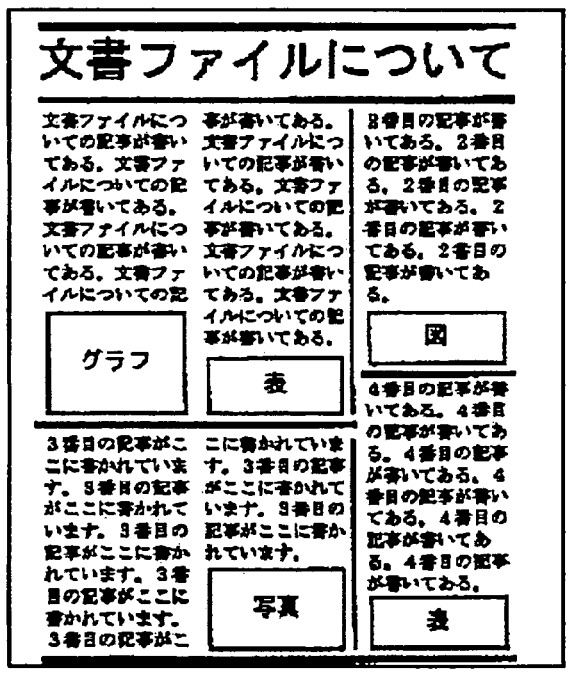
FIGS. 7A, 7B, 8A, 8B, and 9 are examples of results of the area-extraction process shown in FIG. 6.
Figure 7B:
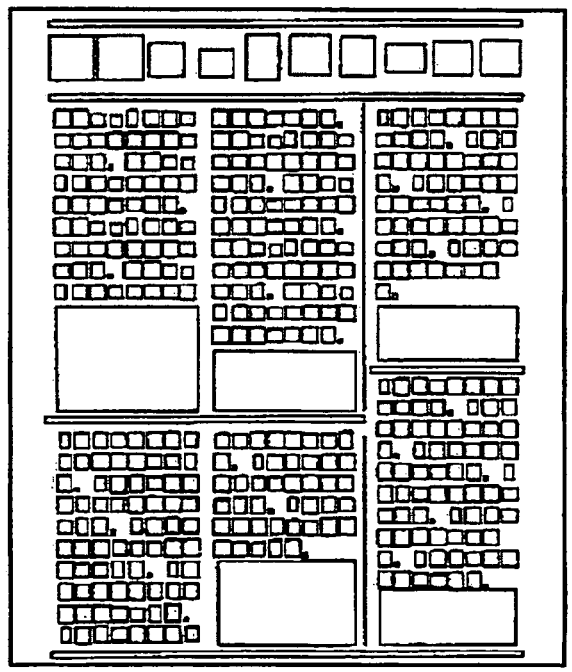

FIG. 6 is a detailed flowchart of the area-extraction process shown in FIG. 5. To begin with, the data extracting unit 401 receives the input image, i.e., image data, from the memory unit 300, and extracts a rectangle that is smallest and contains a continuous black image in the image data (step S601). For example, suppose the input image is an image shown in FIG. 7A, then an extracted rectangle is as shown in FIG. 7B.

Figure 8A:
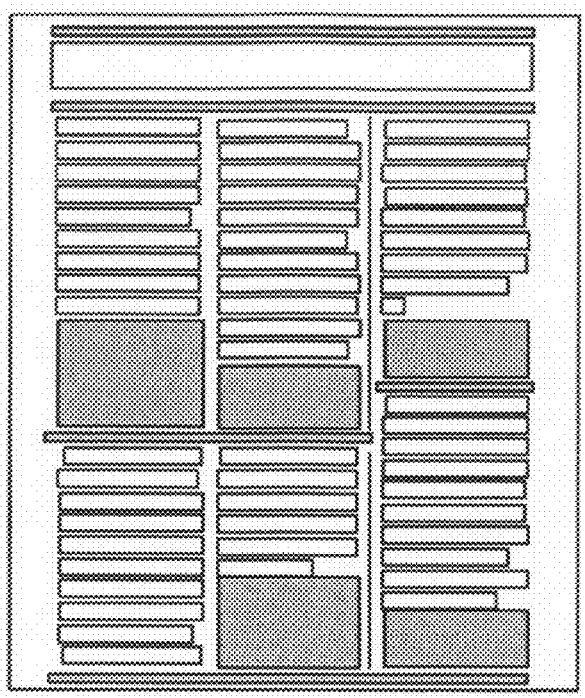

The data extracting unit 401 then unifies adjacent rectangles to obtain a larger rectangle (step S602). When the size of the rectangle falls within a predetermined range, it is determined whether the rectangle corresponds to a character (step S603). If the rectangle does not correspond to character, the process control goes to step S606. If the rectangle corresponds to a character, a character row is extracted by the unification of rectangles (step S604). A result of extracting rows is shown in FIG. 8A.

Figure 8B:
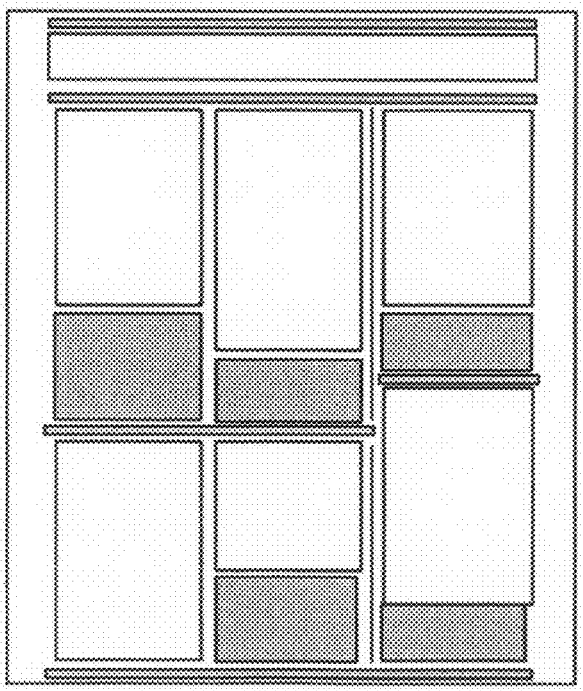

Furthermore, if adjacent rows are closely situated within a predetermined range, the data extracting unit 401 unifies the adjacent rows (step S605), and extracts a text area (step S606). A result of extracting of text areas is shown in FIG. 8B. Shadow portions in FIGS. 8A and 8B represent areas other than a text. Determination on such areas is achieved by determining on an area from which rectangle size and row cannot be extracted.

Figure 9:
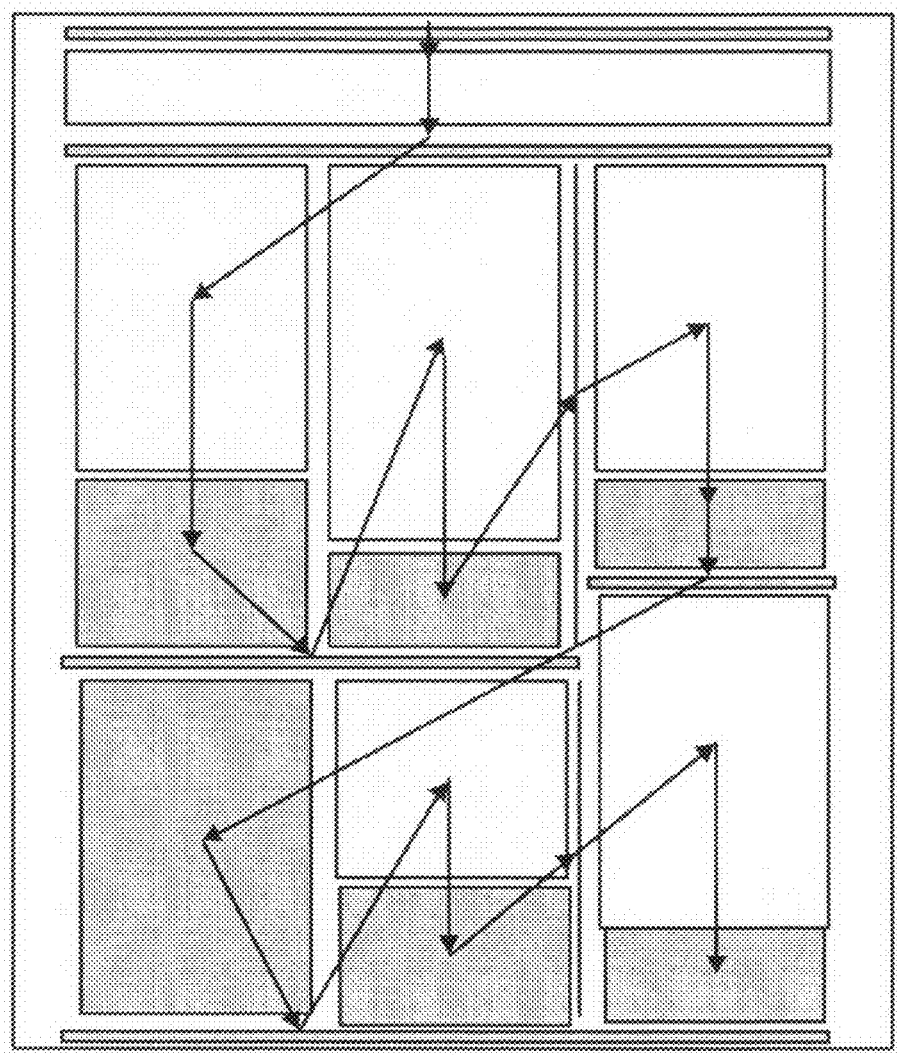

Finally, the data extracting unit 401 determines the order of reading the extracted areas (step S607). The reading order can be determined by following the areas in a direction from the top to the bottom and from the left to the right when the row direction is horizontal (horizontal writing), by contrast, when the row direction is vertical (vertical writing) by following the areas in a direction from the top to the bottom and from the right to the left. A result of the determination is shown in FIG. 9.

The attribute-extraction process shown in FIG. 5 is explained in detail below with reference to FIG. 10. To begin with, a result of extracting areas in a material document image is read in a reading order from area data to area type (steps S1001 and S1002). An example of the result of extracting the areas obtained at steps S1001 to S1002 is shown in FIG. 11, in which an area determination result is stated on each area divided in order of reading.

The data creating unit 405 then determines the type of an area read at step S1002, i.e., whether it is a text area (step S1003). If it is not a text area, the process control goes back to step S1001.

By contrast, if it is a text area, numeral string data of characters in the determined area is extracted (step S1004) (see FIG. 12). After the process from step S1001 to S1004 is performed on all of the determined text areas (step S1005), a key-information creating process is performed to create registration key information (or search key information) from numeral string data of respective areas (step S1006), and then the process ends. The created registration key information (or search key information) of the material document image is to be used for registration or search.

Figure 10:
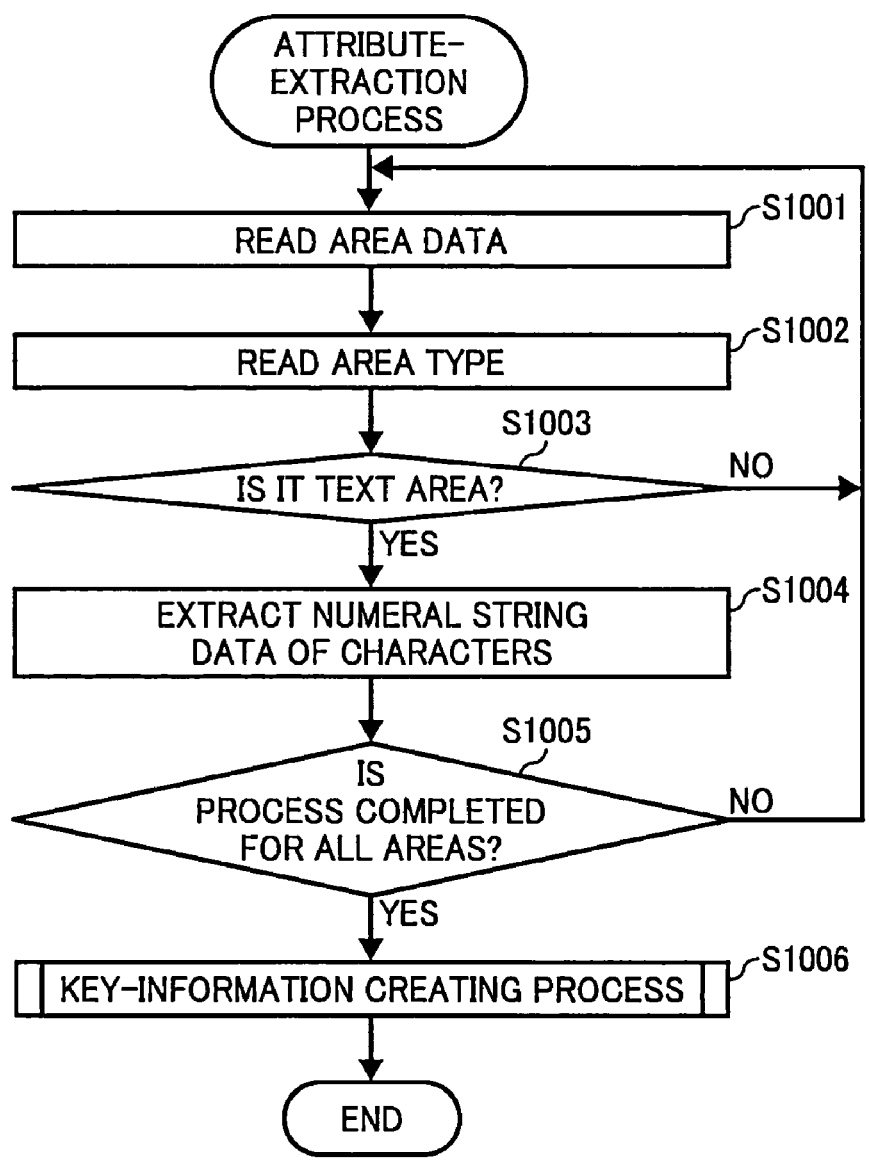
FIG. 10 is a detailed flowchart of image attribute-extraction process shown in FIG. 5.

The creation of registration key information (or search key information) from characters in each area in a material document image performed at step S1006 in FIG. 10 is explained in detail below with reference to FIGS. 12 and 13.

Figure 13:
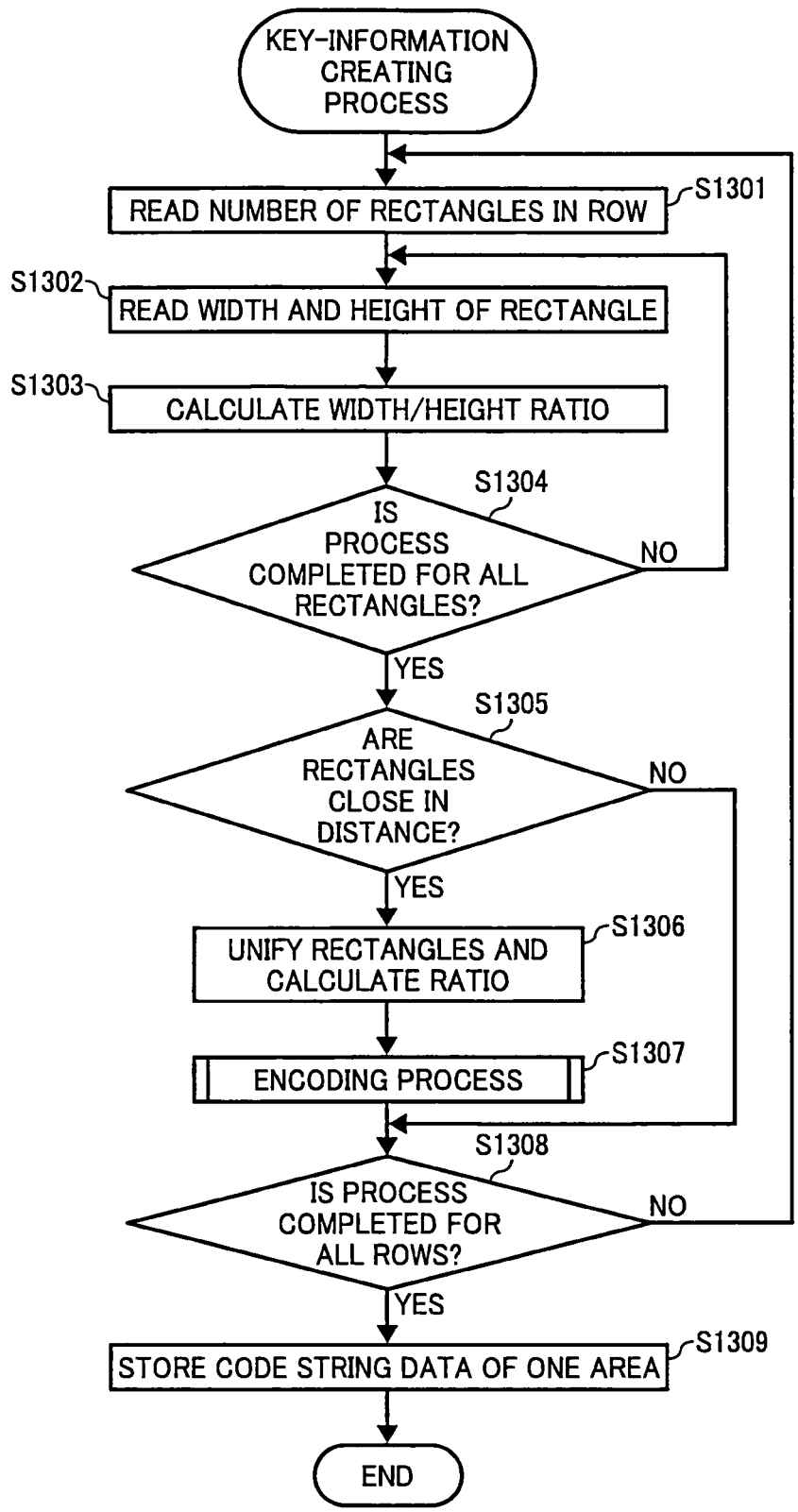
FIG. 13 is a detailed flowchart of a key-information creating process shown in FIG. 10.

FIG. 13 is a detailed flowchart of the key-information creating process shown in FIG. 10. To begin with, the data extracting unit 401 reads the number of rectangles in the row of characters as shown in a section (b) in FIG. 12 from a result of the area extraction (step S1301), and reads the width and the height of one of the rectangles (step S1302).

Subsequently, the data extracting unit 401 calculates a ratio of, for example, the width to the height of one of the read rectangles (step S1303). The data extracting unit 401 then performs the process from step S1301 to S1303 on the all rectangles (step S1304).

The data extracting unit 401 determines whether adjacent character rectangles are situated within a predetermined range, i.e., close to each other in distance (step S1305). If the distance is short, the data extracting unit 401 calculates a ratio after unifying the adjacent rectangles (step S1306). The data creating unit 405 then performs an encoding process to encode numeral string data from a ratio for a portion of one row (step S1307).

Figure 15:
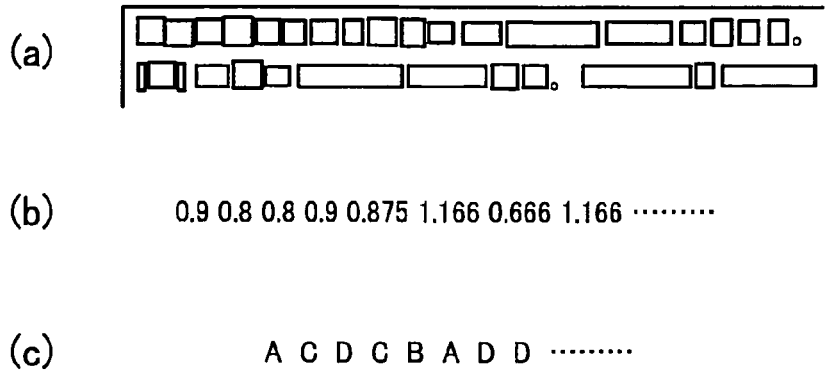
FIG. 15 is a schematic diagram for explaining the encoding process shown in FIG. 14.

As shown in a section (c) in FIG. 12, if adjacent character rectangles are situated within a predetermined distance, the rectangles are unified, and then a ratio for the unified rectangles is calculated. In such case, a character rectangle length tends to be long, however, the number of rectangles is reduced, so that data volume of a text area that includes English words is relatively small. The above processing is performed across all rows in an area, and then codes are written. An example of encoded data (code string data) is shown in FIG. 15. In FIG. 15, ratios of rectangles on the first to the eighth rows shown in the section (c) in FIG. 12 are encoded, however, ratios of all rectangles are to be encoded in practice.

The data extracting unit 401 and the data creating unit 405 then perform the process from step S1301 to S1307 on the all rows (step S1308). Thereafter, the data creating unit 405 creates code string data by encoding numeral string data corresponding to a portion of one area. The created code string data is registered as registration key information, which is to be used when searching for an image file (step S1309), and then the process ends.

Figure 14:
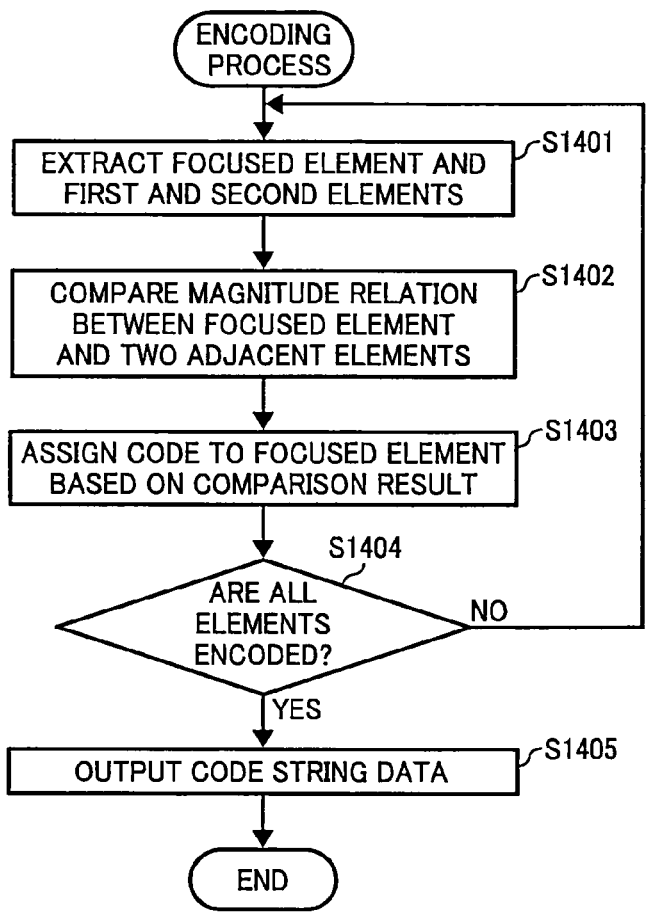
FIG. 14 is a detailed flowchart of an encoding process shown in FIG. 13.

The encoding process shown in FIG. 13 is explained in detail with reference to FIGS. 14 and 15. FIG. 14 is a detailed flowchart of the encoding process.

When ratios of all rectangles in a row are calculated at step S1306 in FIG. 13, and numeral string data is created from the calculated ratios, the data creating unit 405 encodes sequentially from the left end each of elements included in numeral string data based on a conversion table as shown in FIG. 16. In the example shown in FIG. 15, numeral string data shown in a section (b) is calculated at step S1306 from rectangles on each row shown in a section (a).

To begin with, an element to be encoded (hereinafter, "focused element"), and two adjacent elements next to the focused element on the right are extracted from numeral string data (step S1401). Because there is no element adjacent to a right end element of the numeral string data, it is assumed that an infinite element is extracted as two adjacent elements next to the right end element. Although it is assumed that an infinite element is extracted when there is no adjacent element, an assumed extracted element can have a predetermined value, such as an infinitesimal or zero.

After the focused element and the two adjacent elements are extracted, magnitude relation between the focused element and the two adjacent elements is evaluated with reference to the conversion table as shown in FIG. 16 (step S1402). Based on the conversion table, a code is assigned to the focused element (step S1403).

Although the adjacent elements on the right of the focused element are cited above to be extracted and compared to the focused element in terms of magnitude relation, the adjacent elements can be elements adjacent to the left of the focused element, or elements each on the left and the right of the focused element, and compared with the focused element in magnitude. Moreover, the number of n of elements to be extracted can be increased, and each element can be encoded by using a conversion table to assign codes of the n-th power of two. Furthermore, a comparison result X on magnitude relation with the focused element can be categorized into three, namely, larger, equal, and smaller, and each element can be encoded by using a conversion table to assign codes of the third power of X.

For example, when encoding the left end element 0.9 in numeral string data shown in a section (b) in FIG. 15, 0.8 (hereinafter, "first element") and 0.8 (hereinafter, "second element") adjacent to the right of the left end element are extracted, and then the focused element 0.9 is compared with the first element 0.8, and with the second element 0.8 in terms of magnitude relation. The focused element 0.9 is smaller than the first element 0.8, and smaller than the second element 0.8, so that the focused element 0.9 is assigned a code D according to the conversion table shown in FIG. 16.

The data creating unit 405 then performs the process from step S1401 to S1403 on the all elements (step S1404), and outputs code string data as indicated by a section (c) in FIG. 15, which is created by encoding the all elements (step S1405).

According to the above configuration, for example, a document having the same contents but a different aspect ratio can be assigned similar code string data, so that image data having the same contents can be found based on image data having an aspect ratio different from that of registered image data.

Although according to the above configuration, image data is input into the digital photocopier, numeral string data is extracted from the image data, and code string data is created based on the numeral string data, the embodiment is not limited to this. For example, if encoding already digitized data, such as a stock price chart, or plant management data, numeral string data can be input into an encoding device such as an information processor, and encoded. In other words, according to the first embodiment, if a value of each element included in numeral string data changes while keeping magnitude relation to adjacent elements, the each element is encoded based on the magnitude relation, and converted into the same code string data regardless of change in the value of the each element. Accordingly, for example, when analyzing a stock price chart across various periods, even if prices of the stock in comparative periods are different from each other, a trend of the stock price in each period can be grasped by converting the stock price chart into code string data and comparing the code string data.

A digital photocopier according to a second embodiment of the present invention is of basically the same configuration and operates in the similar manner as previously described for the digital photocopier according to the first embodiment. When registering an image file, the digital photocopier according to the second embodiment extracts numeral string data from a projection histogram of a text area, a photograph area, or a table area, encodes the numeral string data, registers the image file including image data and code string data, and moreover, when searching for an image file, searches for an image data based on code string data similarly created from read image data, and finds the image data having a text area, a photograph area, or a table area, which has the same contents as the code string data regardless of an aspect ratio of the image data.

Processes of registration of an image file, searching for an image file, and image conversion according to the second embodiment are similar to those of the first embodiment explained in connection with FIGS. 5 to 9, and therefore, the same explanation is not repeated.

The image-conversion process is explained about characteristics different from the first embodiment. The attribute-extraction process shown in FIG. 5 of the second embodiment is explained in detail below with reference to FIG. 17. To begin with, a result of extracting areas in a material document image is read in a reading order from area data to area type (steps S1701 and S1702). An example of the result of extracting the areas obtained at steps S1701 to S1702 is shown in FIG. 11, in which an area determination result is stated on each area divided in order of reading.

Figures 17, 18:
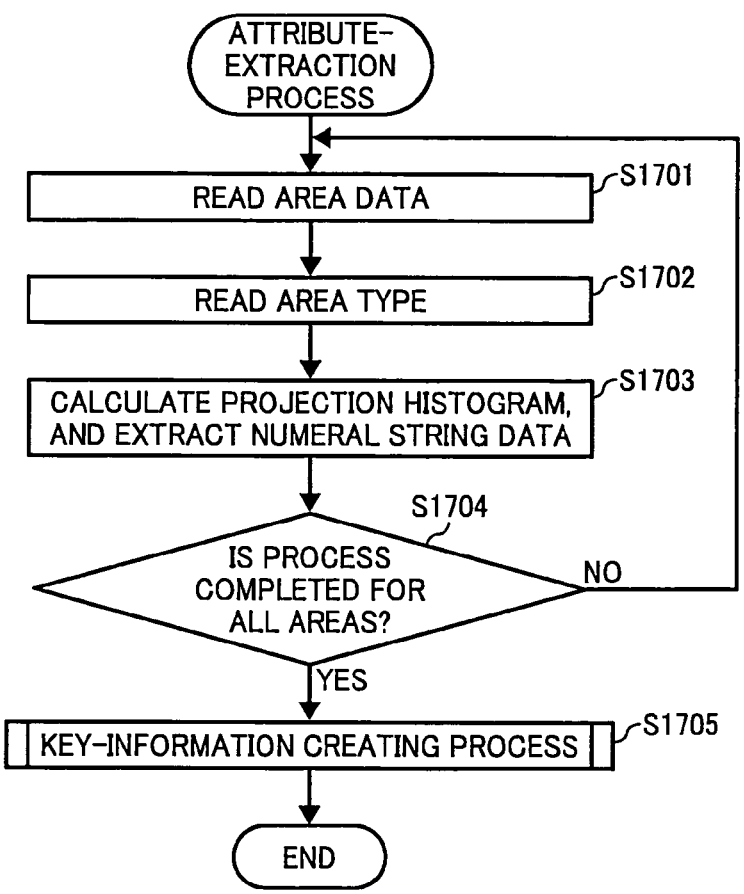
FIG. 17 is a detailed flowchart of the attribute-extraction process according to a second embodiment of the present invention.
FIG. 18 is a schematic diagram for explaining an image-conversion process according to the second embodiment.

The data extracting unit 401 then calculates a projection histogram of each area, and extracts numeral string data from the projection histogram (step S1703). For example, suppose image data in a data format shown in a section (a) in FIG. 18 is input. Each cell corresponds to a pixel of a binary image, a cell with 0 indicates a white pixel, and a cell with 1 indicates a black pixel. The data extracting unit 401 counts the total number of black pixels in the input image data in the vertical direction or the horizontal direction, and extracts numeral string data based on the count. By counting black pixels vertically in the image data shown in the section (a) in FIG. 18, the following numeral string data is extracted. The summed counts of the first column, the second column, the third column, the fourth column, and the fifth column from the left are 1, 3, 4, 2, and 1, respectively, which are arranged in order from the left, as a result, numeral string data shown in a section (b) in FIG. 18, namely, 13421, is extracted.

Figure 19:
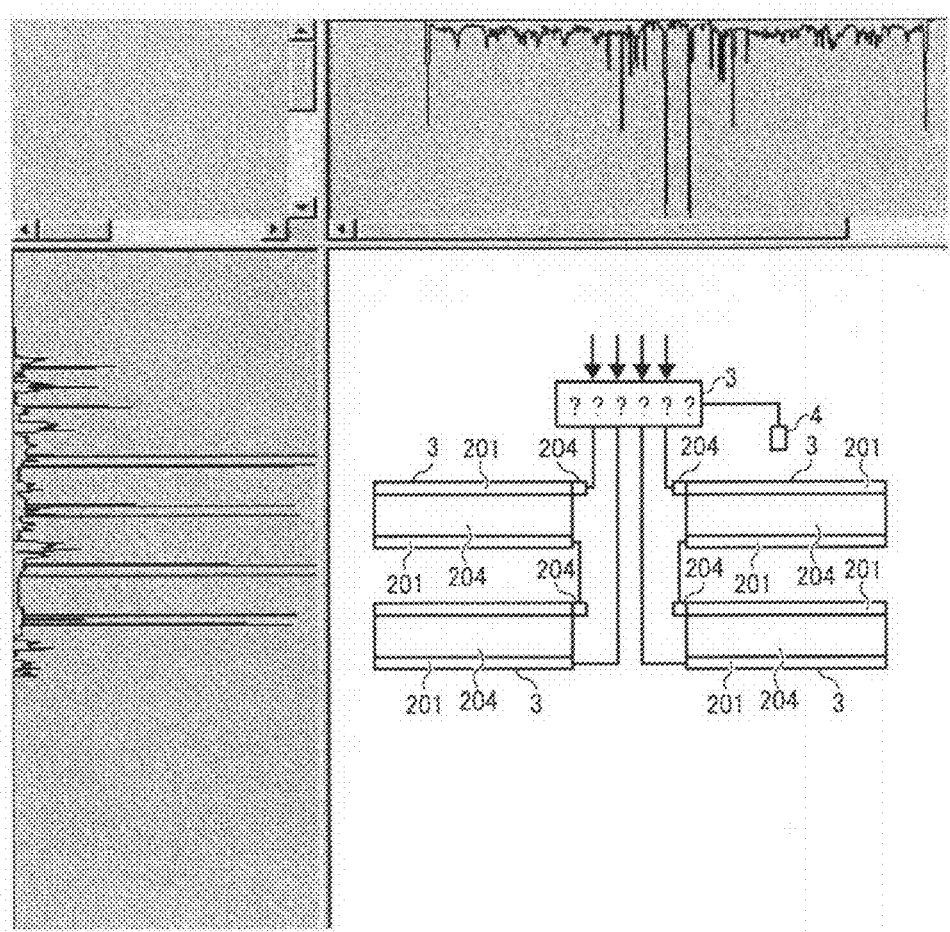
FIG. 19 is an example of a horizontally-counted projection histogram and a vertically-counted projection histogram according to the second embodiment.

Although the numeral string data is extracted by counting black pixels in the above explanation, numeral string data can also be extracted by counting white pixels. In addition, black pixels or white pixels can also be counted horizontally as shown in FIG. 19. Furthermore, two sets of numeral string data can be extracted by counting pixels in both the vertical and horizontal directions.

Figure 20:
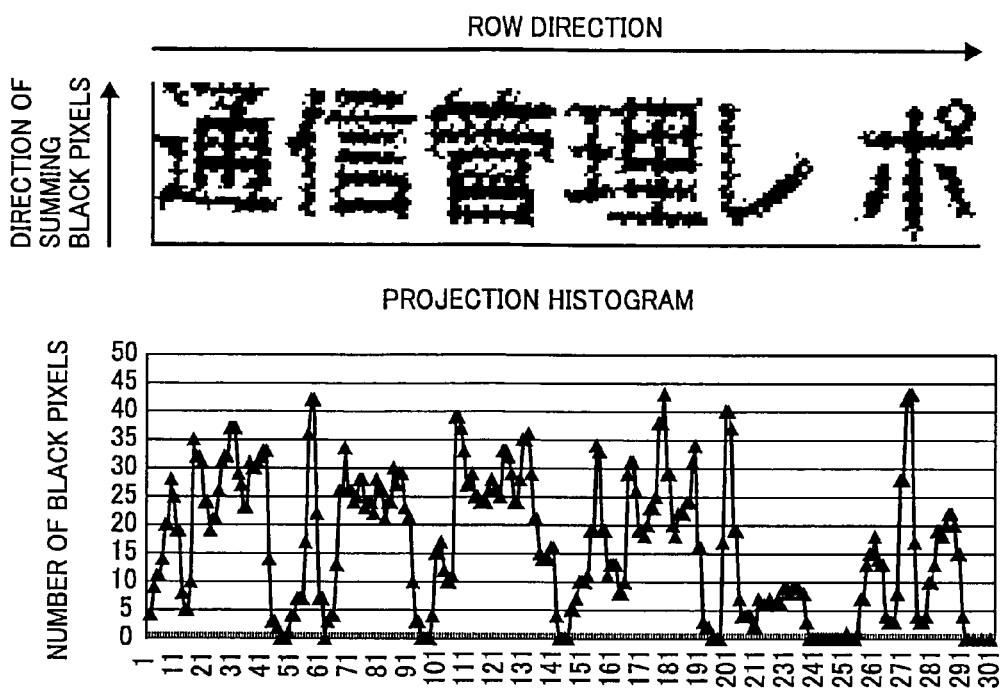
FIG. 20 is a schematic diagram for explaining a material image and its projection histogram according to the second embodiment.

As shown in FIG. 20, a projection histogram is a diagram created by counting black pixels in a material document image vertically along a row direction, so that a different character form has a waveform of a different projection histogram. In other words, a projection histogram can be used as characteristics of a character image. A character image is not assumed to be separated into individual characters, so that a projection histogram of characters of any language that can be arranged in a row, for example, hand writing, running hand, or Arabic script, can be created regardless of language.

Because each value indicated on a projection histogram is the number of black pixels, so that the value can change per pixel caused by influences, such as reading conditions, noise, or thin spot. Therefore, matching waveforms by using accurate values of projection histograms has no meaning, but a waveform expressed using a approximate value can express characteristics of a character image. According to the second embodiment, values in a projection histogram are quantized, and numeral string data is extracted from the quantized projection histogram. Processing of quantizing a projection histogram will be explained later.

The data extracting unit 401 performs the process from step S1701 to S1703 on all areas (step S1704), the data creating unit 405 creates registration key information (or search key information) from numeral string data of each area (step S1705), and then the process ends. The created registration key information (or search key information) is to be used for registration or search.

The process at step S1703 of FIG. 17 is explained in detail below. Values of the projection histogram are quantized, and numeral string data is extracted from the quantized projection histogram.

The projection histogram is a series of the sum of the number of black pixels, and easily changes under different conditions even if reading the same material document, therefore direct use of accurate values of totals of the black pixels is meaningless. For determination based on an approximate profile of the waveform, small fluctuations are ignored, and errors are absorbed by smoothing small fluctuations to determine characteristics according to a total rough shape.

Taking a moving average can be used as a technique of smoothing a waveform on the one-dimensional time-series. Suppose values on the time-series (the number of black pixels in a projection histogram) are A0, A1, A2, A3, A4, A5, and so on, and the moving-average width is five points including a focused point and two points each before and after the focused point, a moving average is calculated as follows:

focused point A2: (A0+A1+A2+A3+A4)/5=moving average M2;

focused point A3: (A1+A2+A3+A4+A5)/5=moving average M3;

focused point A4: (A2+A3+A4+A5+A6)/5=moving average M4; and so forth.

Figure 21:
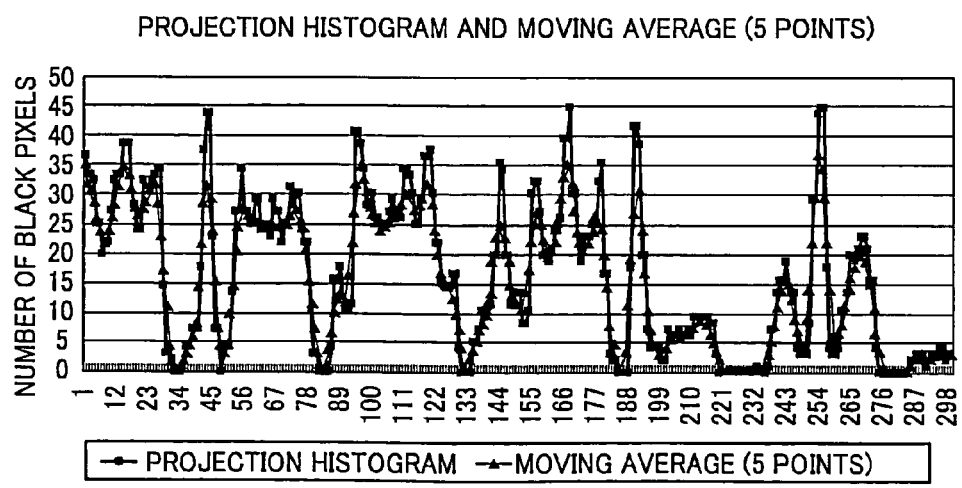
FIG. 21 is an example of a smoothed projection histogram created from the projection histogram shown in FIG. 20 by using a moving average.
Figure 22:
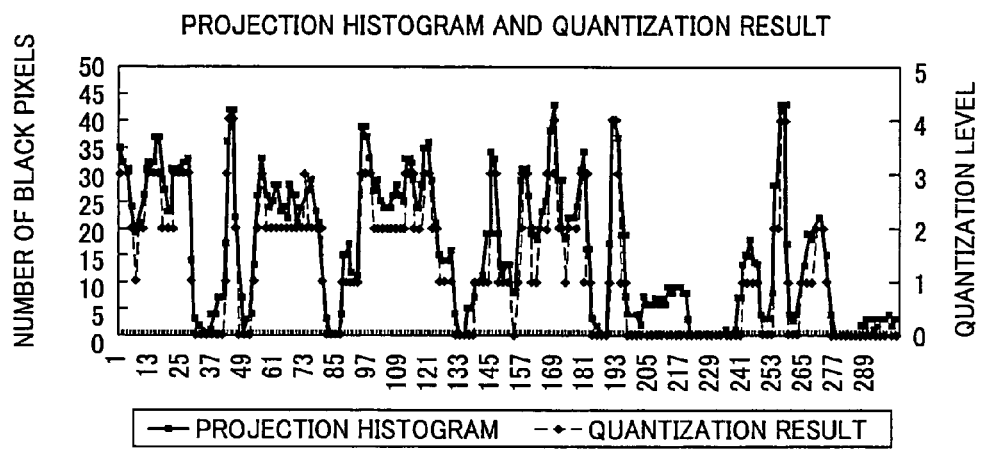
FIG. 22 is an example of a quantized projection histogram created from the smoothed projection histogram shown in FIG. 21.

FIG. 21 is an example of a projection histogram smoothed by five points of the moving-average width. As seen in FIG. 21, the projection histogram of the material image is smoothed as an approximate profile of the waveform is maintained. Furthermore, values of the smoothed waveform are quantized into fixed levels, and then numeral string data is extracted as shown in FIG. 22. According to FIG. 22, suppose a value at a horizontal coordinate i in the projection histogram is yi. Regarding yi, for example, if quantizing yi according to the following criteria, yi is converted into five levels as follows:

level 0: $0 \leq yi < 10$
level 1: $10 \leq yi < 20$
level 2: $20 \leq yi < 30$
level 3: $30 \leq yi < 40$
level 4: $40 \leq yi$ In FIG. 22, the scale of the left axis indicates values before quantization, and the scale of the right axis indicates values after the quantization. As seen in FIG. 22, the waveform after the quantization expresses an outer profile of the original waveform.

Figure 23:
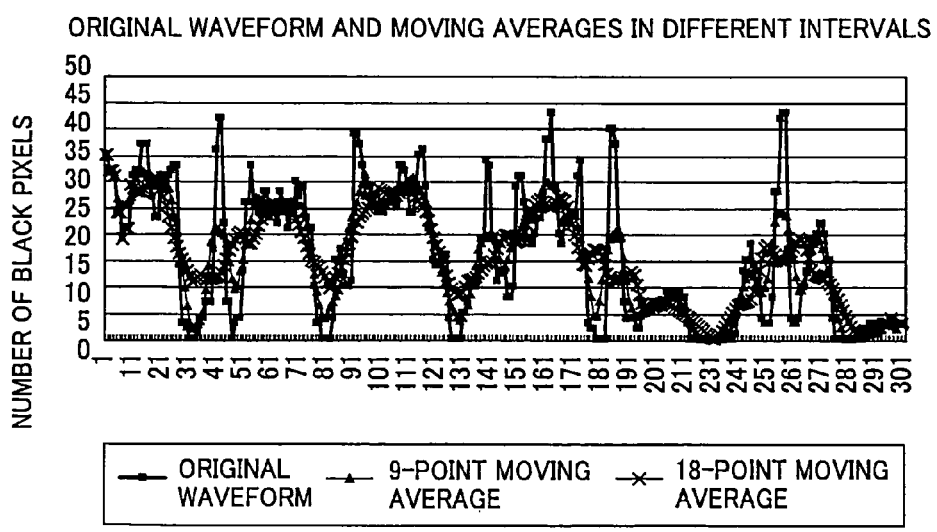
FIG. 23 is another example of a smoothed projection histogram created from the projection histogram shown in FIG. 20 by using a moving average of a different moving-average width.

FIG. 23 depicts a waveform of a projection histogram smoothed with a different moving-average width and the original waveform. It is clearly shown that the wider the moving-average width is, the more the small fluctuations are smoothed. As a projection histogram is smoothed more, change in the number of black pixels due to difference in reading conditions is influenced less, however, the characteristics of the original waveform tend to disappear. Disappearing of the characteristics of the original waveform means that characteristics to distinguish between a similar one and a dissimilar one turn to less obvious, and accuracy of image matching is decreased. The moving-average width need be determined according to complexity of an original waveform and complexity of a subject aggregation of distinction (to what extent substantially similar image is included), and cannot be predetermined at a fixed value. For this reason, the moving-average width can be changed depending on a search subject, and a user can control it.

Processing of reducing the number of elements included in numeral string data by sampling a smoothed projection histogram is explained below.

If numeral string data extracted from a projection histogram is long, and code string data created from the numeral string data is long, it takes a long time at search of image data for matching registration key information and search key information, both of which includes code string data.

Figure 24A:
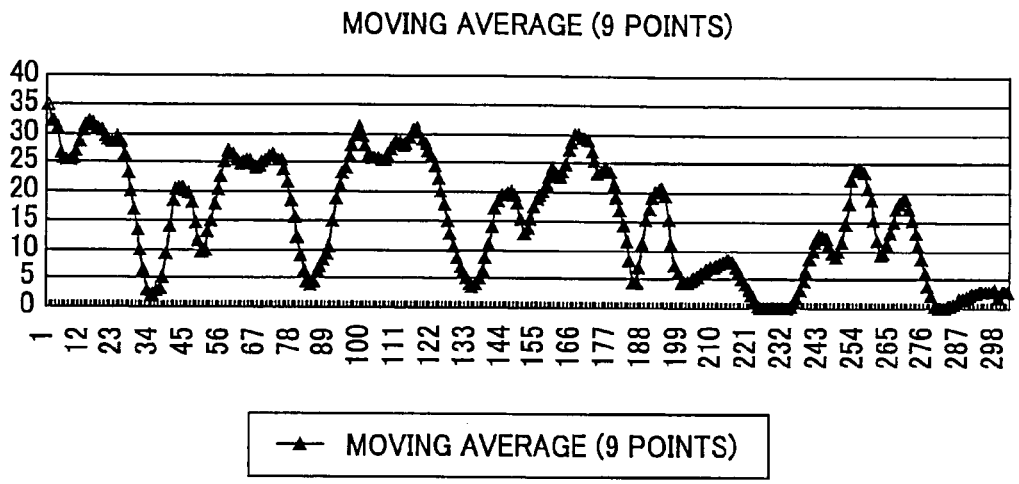
FIGS. 24A and 24B are examples of a sampled projection histogram according to the second embodiment.
Figure 24B:
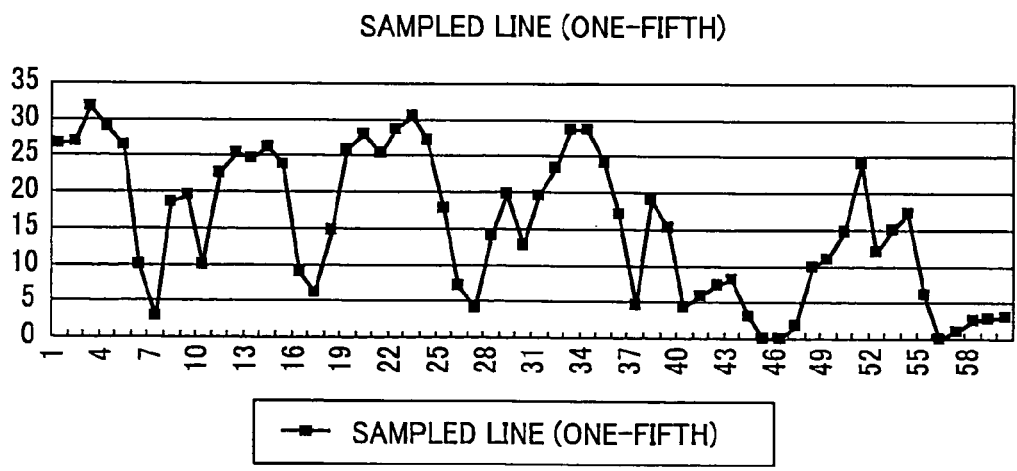

By sampling the projection histogram horizontally, and extracting numeral string data, code string data created from the numeral string data can be shortened. FIG. 24A depicts the projection histogram smoothed by nine points of the moving-average width. FIG. 24B depicts the projection histogram smoothed by nine points of the moving-average width of which waveform sampled one fifth. Sampling is to obtain a representative value at one point in each interval predetermined horizontally on the projection histogram (hereinafter, "sampling interval"). For example, one point can be selected at random in a range of the sampling interval, or a value corresponding to the center of the sampling interval can be selected. As shown in FIGS. 24A and 24B, a waveform after sampling is performed maintains characteristics of the original waveform. However, if the sampling interval is not set properly, the characteristics of the original waveform may be lost, therefore the sampling interval is left available for a user to control.

Figure 25:
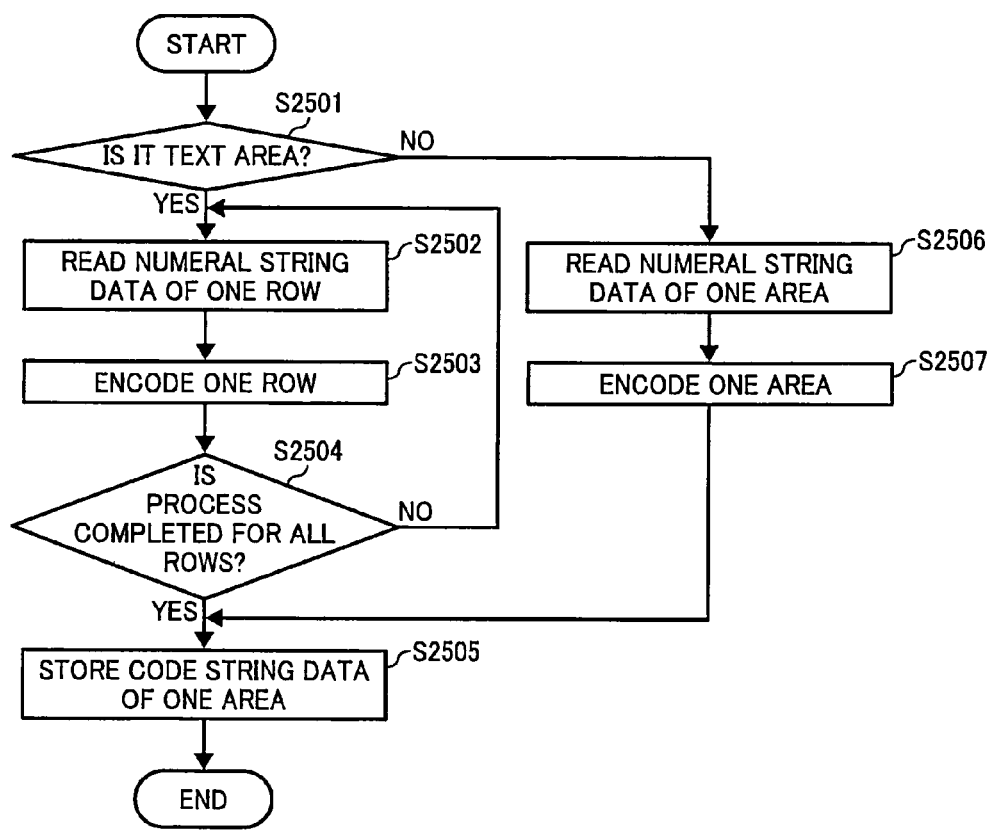
FIG. 25 is a detailed flowchart of the key-information creating process shown in FIG. 17.

FIG. 25 is a detailed flowchart of the key-information creating process shown in FIG. 17. To begin with, the data creating unit 405 determines whether an area to be encoded is a text area based on an area type read at step S1702 shown in FIG. 17 (step S2501). If the area is a text area, the data creating unit 405 reads a portion of one row of the numeral string data in the area (step S2502).

The data creating unit 405 then encodes the read numeral string data (step S2503). The data creating unit 405 then performs the process from step S2502 to S2503 on all rows elements (step S2504).

By contrast, if the area is not text area, the data creating unit 405 reads numeral string data in the area (step S2506), and creates code string data by encoding the read numeral string data (step S2507). A section (c) in FIG. 18 is code string data created by encoding the numeral string data shown in the section (b) in FIG. 18.

When encoding of an area is finished, the code string data is then registered as registration key information, which is to be used when searching for an image file (step S2505), and the process ends.

The encoding of numeral string data is similar to the processing explained in the first embodiment with reference to FIGS. 14 to 16, so that explanation of it is omitted.

According to the above configuration, for example, regardless of the type of an area, such as a text area, a graphic area, and a table area, if an area document has the same contents, even if its aspect ratio is different, the area can be assigned similar code string data, so that image data having the same contents can be found based on image data having an aspect ratio different from that of registered image data.

Figure 26:
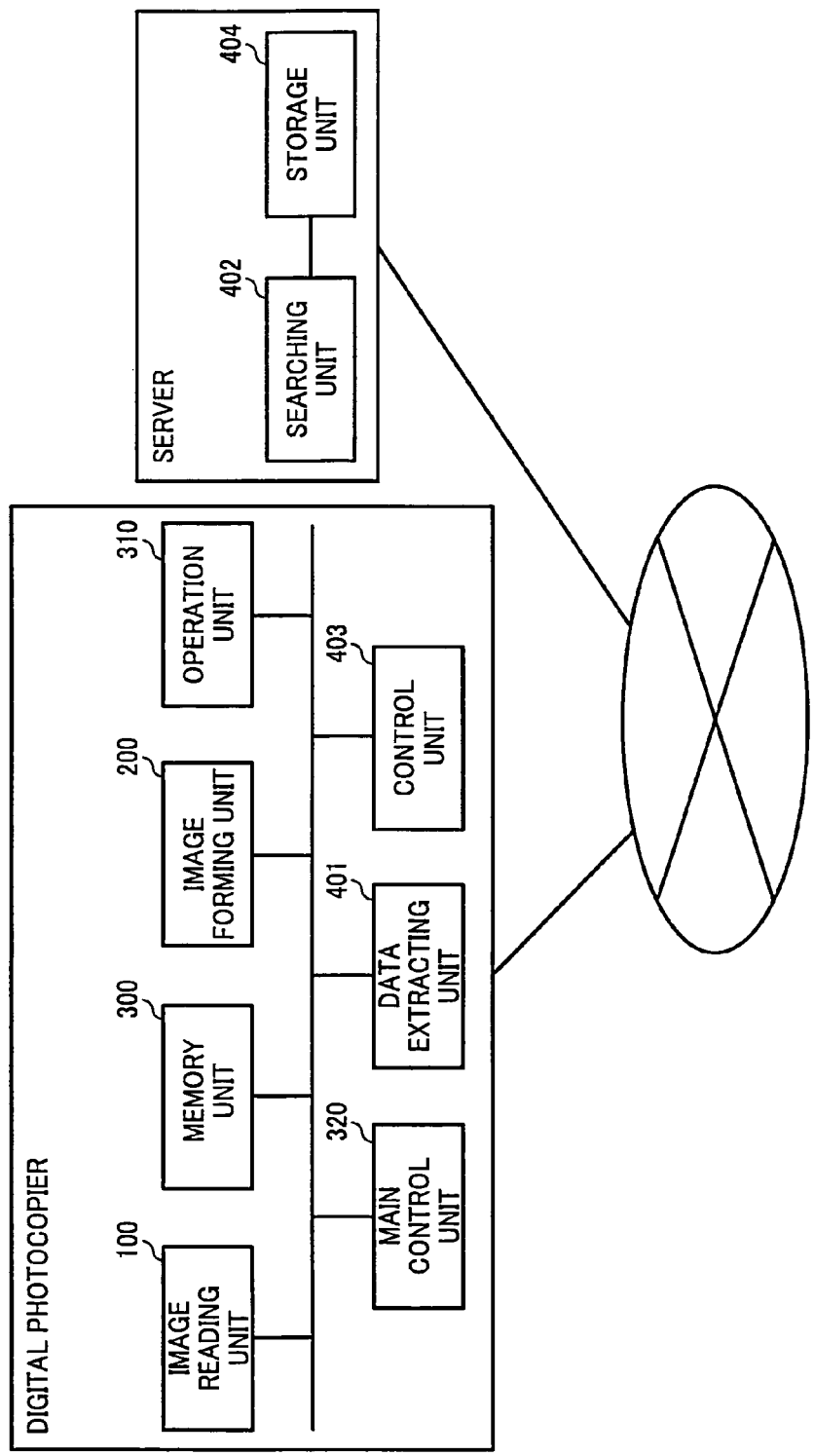
FIG. 26 is a functional block diagram of a hardware configuration of a data searching system according to a third embodiment of the present invention.
Figure 27:
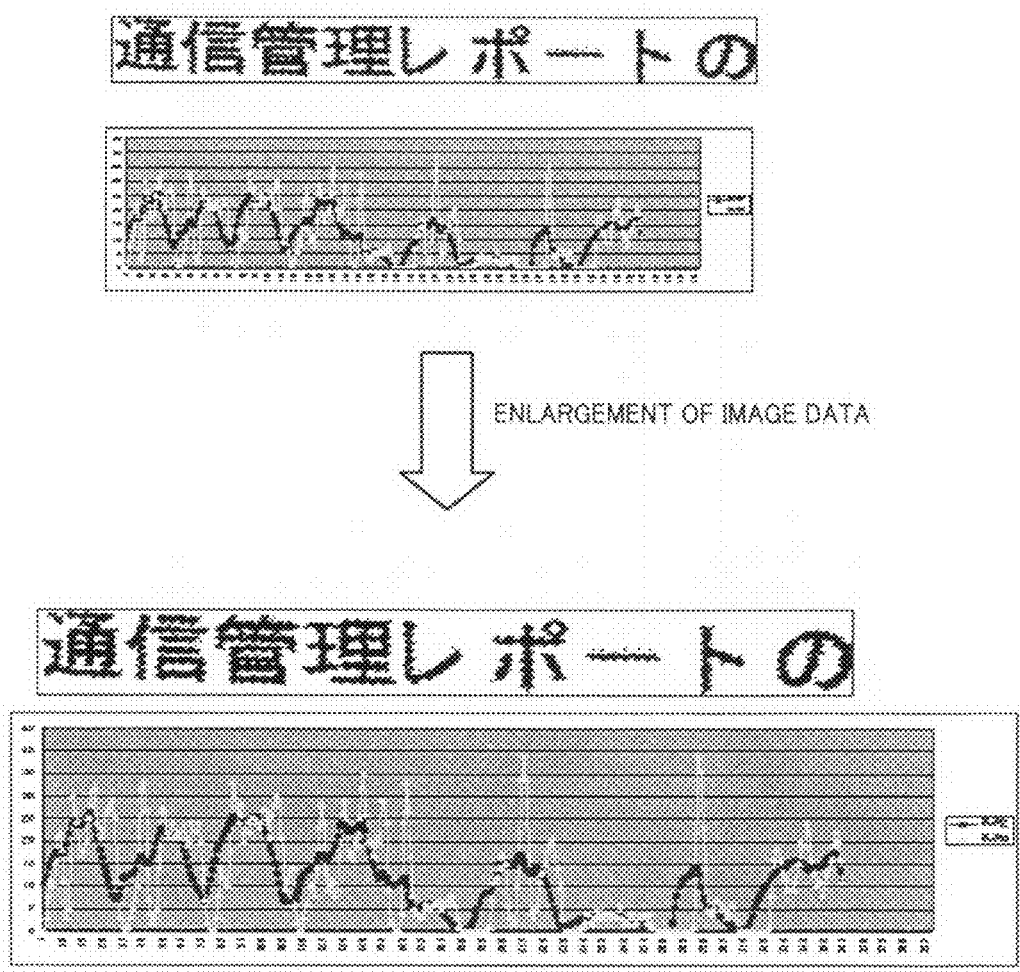
FIG. 27 is examples of projection histograms of image data enlarged with a different aspect ratio according to a conventional technology.

According to the first and second embodiments, all of the components of the image processing device 400 are mounted on a digital photocopier. However, according to a third embodiment of the present invention, as shown in FIG. 26, the searching unit 402 and the storage unit 404 are installed on a server connected to the image processing device 400 via a network. On the other hand, the data extracting unit 401, the control unit 403, and the data creating unit 405 are installed on a digital photocopier operated by a client that is capable of searching the server for an image file via the network. A configuration and operation of each unit is similar to the above embodiments.

The digital photocopier according to the first to third embodiments has a module configuration that includes the above units (the data extracting unit 401, the searching unit 402, the storage unit 404, the control unit 403, and the data creating unit 405). Each of the modules are implemented on a main memory as a central processing unit (CPU) reads and executes computer programs that are provided as incorporated in advance in a read-only memory (ROM) or other units.

The computer programs can be provided, as files in an installable format or an executable format, as being stored in a computer-readable medium, such as a compact disc read only memory (CD-ROM), a flexible disk (FD), a compact disc recordable (CD-R), and a digital versatile disk (DVD).

The computer programs can also be stored in another computer connected to the computer via a network, such as the Internet, and downloaded therefrom. Moreover, the computer programs can be provided or distributed via a network, such as the Internet.

According to an embodiment of the present invention, even if each element included in numeral string data changes in value while keeping magnitude relation to adjacent elements, the each element is encoded based on the magnitude relation, and converted into the same code string data regardless of change in the value of the each element.

Moreover, regardless of the type of an area, such as a text area, a graphic area, and a table area, an area having the same contents can be assigned similar code string data even if its aspect ratio is different. Thus, image data having the same contents can be found based on image data having an aspect ratio different from that of registered image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
    an acquiring unit that acquires numeral string data, the numeral string data extracted from image data by an extracting unit, including a plurality of numeric elements;
    a creating unit that encodes each numeric element in the numeral string data to create code string data by assigning a code to each numeric element in the numeral string data based on (i) a magnitude relation, which is determined by comparing a numeric element to be coded and at least one adjacent numeric element (ii) and conversion information, the conversion information associating magnitude relations with assignable codes;
    a storage unit stores therein the code string data as registration information and the image data in an associated manner; and
    a searching unit that searches for the image data having the registration information that matches search information, the search information being the code string data encoded by the creating unit.

2. The information processing apparatus according to claim 1, further comprising:
    a storage unit that stores therein the code string data as registration information and the numeral string data in an associated manner; and
    a searching unit that searches for the numeral string data based on the registration information.

3. The information processing apparatus according to claim 1, wherein the extracting unit extracts a character rectangle from a text area of the image data, and calculates a ratio of a width to a height of the character rectangle to extract the numeral string data.

4. The information processing apparatus according to claim 3, wherein the extracting unit unifies adjacent character rectangles to obtain the character rectangle.

5. The information processing apparatus according to claim 4, wherein, upon determining that a size of a rectangle falls within a predetermined range, the extracting unit determines that the rectangle is a character rectangle.

6. The information processing apparatus according to claim 5, wherein the extracting unit extracts rows from the image data, and unifies adjacent rows to obtain the text area.

7. The information processing apparatus according to claim 1, wherein the extracting unit calculates a projection histogram of each area in the image data, and extracts the numeral string data from the projection histogram.

8. The information processing apparatus according to claim 7, wherein the extracting unit calculates a projection histogram of a text area per row in the text area.

9. The information processing apparatus according to claim 1, wherein the searching unit acquires a plurality of elements from the code string data as search keys from any one of a right end and a left end of the code string data, and searches for the image data having the registration information that includes a number of search keys.

10. An information processing method comprising:
    acquiring, by an acquiring unit, numeral string data extracted from image data by an extracting unit, the numeral string data including a plurality of numeric elements;
    encoding, by a creating unit, each numeric element in the numeral string data to create code string data by assigning a code to each numeric element in the numeral string data based on (i) a magnitude relation which is determined by comparing a numeric element to be coded and at least one adjacent numeric element and (ii) conversion information, the conversion information associating magnitude relations with assignable codes;
    storing, by a storage unit, the code string data as registration information and the image data in an associated manner; and
    searching, by a searching unit, for the image data having the registration information that matches search information, the search information being the code string data encoded by the creating unit.

11. The information processing method according to claim 10, further comprising:
    storing, by a storage unit, the code string data as registration information and the numeral string data in an associated manner; and
    searching, by a searching unit, for the numeral string data based on the registration information.

12. The information processing method according to claim 10, wherein the extracting includes extracting a character rectangle from a text area of the image data, and calculating a ratio of a width to a height of the character rectangle to extract the numeral string data.

13. The information processing method according to claim 10, wherein the extracting includes calculating a projection histogram of each area in the image data, and extracting the numeral string data from the projection histogram.

14. A non-transitory computer-readable recording medium that stores therein a computer program that causes a computer to execute:
    acquiring numeral string data extracted from image data, the numeral string data including a plurality of numeric elements;
    encoding each numeric element in the numeral string data to create code string data by assigning a code to each numeric element in the numeral string data based on (i) a magnitude relation which is determined by comparing a numeric element to be coded and at least one adjacent numeric element and (ii) conversion information, the conversion information associating magnitude relations with assignable codes;
    storing the code string data as registration information and the image data in an associated manner; and
    searching for the image data having the registration information that matches search information, the search information being the code string data encoded by the creating unit.

15. The non-transitory computer-readable recording medium according to claim 14, further causing the computer to execute:
    storing the code string data as registration information and the numeral string data in an associated manner; and
    searching for the numeral string data based on the registration information.

16. The information processing apparatus according to claim 1, wherein the conversion information indicates an assignable code based on a comparison of (i) the magnitude relation of the numeric element to be coded and a magnitude relation of a first element adjacent to the numeric element to be coded and (ii) the magnitude relation of the numeric element to be coded and a magnitude relation of second element adjacent to the first element.

17. The information processing apparatus according to claim 1, wherein the assignable code for each numeric element is one of A, B, C, and D.

18. A searching system comprising:
    an acquiring unit that acquires numeral string data extracted from image data by an extracting unit, the numeral string data including a plurality of numeric elements;
    a creating unit that encodes each numeric element in the numeral string data to create code string data by assigning a code to each numeric element in the numeral string data based on (i) a magnitude relation which is determined by comparing a numeric element to be coded and at least one adjacent numeric element (ii) and conversion information, the conversion information associating magnitude relations with assignable codes;
    a storage unit that stores therein the code string data as registration information and the image data in an associated manner; and
    a searching unit that searches for image data having the registration information that matches search information, the search information being the code string data encoded by the creating unit.

* * * * *